(12) United States Patent
Jain et al.

(10) Patent No.: US 9,173,066 B1
(45) Date of Patent: Oct. 27, 2015

(54) METHODS AND SYSTEMS FOR CONTROLLING AN ELECTRONIC DEVICE

(71) Applicant: XEROX CORPORATION, Norwalk, CT (US)

(72) Inventors: Kanishk Jain, Rochester, NY (US); Gavan Tredoux, Penfield, NY (US); Premkumar Rajendran, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/303,767

(22) Filed: Jun. 13, 2014

(51) Int. Cl.
*G06F 3/12* (2006.01)
*H04W 4/02* (2009.01)
*H04B 5/00* (2006.01)
*H04W 8/22* (2009.01)

(52) U.S. Cl.
CPC ............. *H04W 4/027* (2013.01); *H04B 5/0025* (2013.01); *H04W 8/22* (2013.01)

(58) Field of Classification Search
None
See application file for complete search history.

(56) References Cited

U.S. PATENT DOCUMENTS

| 8,229,458 | B2 | 7/2012 | Busch |
| 8,325,044 | B2 | 12/2012 | Martinez de Velasco Cortina et al. |
| 8,817,286 | B2 * | 8/2014 | Ishikawa ...................... 358/1.13 |
| 8,855,622 | B2 * | 10/2014 | Gold .............................. 455/420 |
| 8,928,723 | B2 * | 1/2015 | Kang et al. ................. 348/14.02 |
| 8,937,534 | B2 * | 1/2015 | Kreiner et al. ............. 340/12.22 |
| 8,976,393 | B2 * | 3/2015 | Park et al. ..................... 358/1.15 |
| 2008/0278753 | A1 * | 11/2008 | Oda et al. ..................... 358/1.15 |
| 2010/0148977 | A1 | 6/2010 | Tseng et al. |
| 2012/0052872 | A1 | 3/2012 | Do |
| 2012/0143495 | A1 | 6/2012 | Dantu |
| 2012/0146918 | A1 * | 6/2012 | Kreiner et al. ................ 345/173 |
| 2012/0194859 | A1 * | 8/2012 | Oda ............................. 358/1.15 |
| 2012/0290254 | A1 | 11/2012 | Thrun et al. |
| 2013/0083357 | A1 * | 4/2013 | Suzuki ........................ 358/1.15 |
| 2013/0176593 | A1 * | 7/2013 | Nakamura .................... 358/1.15 |
| 2013/0194392 | A1 * | 8/2013 | Qi et al. .......................... 348/50 |
| 2013/0222840 | A1 * | 8/2013 | Hosoda ........................ 358/1.14 |
| 2014/0240777 | A1 * | 8/2014 | Itogawa ...................... 358/1.15 |

* cited by examiner

*Primary Examiner* — Dung Tran

(57) ABSTRACT

According to embodiments illustrated herein there is provided a method for controlling an electronic device. The method includes detecting, in a mobile device, a contact with the electronic device at a predetermined reference location on the electronic device. The method further includes tracking a movement of the mobile device from the predetermined reference location to a second location on the electronic device, wherein the second location corresponds to a first component of the electronic device. Additionally, the method includes receiving an input from a user to control one or more functionalities of the first component.

30 Claims, 10 Drawing Sheets

METHODS AND SYSTEMS FOR CONTROLLING AN ELECTRONIC DEVICE

TECHNICAL FIELD

The presently disclosed embodiments are related, in general, to electronic devices. More particularly, the presently disclosed embodiments are related to methods and systems for controlling electronic devices.

BACKGROUND

Electronic devices of current day have enabled a user to perform various functions through a single device. For example, a multi-function device (MFD) may enable a user to perform functions such as document printing, scanning, fax, emailing, etc. Similarly, a typical smart-phone includes a camera, memory, and GPS sensors that enable the user to perform various functions (e.g., emailing, navigation, etc.) other than just initiating calls and sending messages.

With increasing number of functionalities being bundled into a typical electronic device, there may be an increase in the design complexity of such electronic devices. Due to such increase in complexity, a user may find it difficult to operate such electronic devices. Additionally, troubleshooting such electronic devices may be a difficult and tedious task for the end-user.

SUMMARY

According to embodiments illustrated herein there is provided a method for controlling an electronic device. The method includes detecting, in a mobile device, a contact with the electronic device at a predetermined reference location on the electronic device. The method further includes tracking a movement of the mobile device from the predetermined reference location to a second location on the electronic device, wherein the second location corresponds to a first component of the electronic device. Additionally, the method includes receiving an input from a user to control one or more functionalities of the first component.

According to embodiments illustrated herein there is provided a method for controlling a multi-function device (MFD). The method includes in a mobile device detecting a contact with the MFD at a predetermined reference location on the MFD, wherein the MFD is capable of processing at least a print job, a scan job, a copy job, a fax job, and an email job. The method further includes tracking a movement of the mobile device from the predetermined reference location to a second location on the MFD, wherein the second location corresponds to a first component of the MFD. Finally, the method includes receiving an input from a user to control one or more functionalities of the first component.

According to embodiments illustrated herein there is provided a method for troubleshooting an electronic device. The method includes detecting a contact with the electronic device at a predetermined reference location on the electronic device. The method further includes receiving readings of one or more sensors from the electronic device. The readings of the one or more sensors are indicative of an error in at least one component of the electronic device. An instruction is received from the electronic device to navigate from the predetermined reference location to a second location. The second location corresponds to a location of a second component on the electronic device. A content is displayed, wherein the content corresponds to at least a method to resolve the error, wherein the error is resolvable manually by a user.

According to embodiments illustrated herein there is provided a method for controlling an electronic device. The method comprising tracking a movement of a mobile device from a predetermined reference location on the electronic device to a second location on the electronic device. The movement of the mobile device is tracked based on a reading of the one or more sensors associated with the mobile device. The reading is received from the mobile device periodically. A first component of the electronic device is determined at the second location. One or more functionalities associated with the first component are transmitted to the mobile device. At least a command is received from the mobile device to control the first component.

BRIEF DESCRIPTION OF DRAWINGS

The accompanying drawings illustrate various embodiments of systems, methods, and other aspects of the disclosure. Any person having ordinary skill in the art will appreciate that the illustrated element boundaries (e.g., boxes, groups of boxes, or other shapes) in the figures represent one example of the boundaries. It may be that in some examples, one element may be designed as multiple elements or that multiple elements may be designed as one element. In some examples, an element shown as an internal component of one element may be implemented as an external component in another, and vice versa. Furthermore, elements may not be drawn to scale.

Various embodiments will hereinafter be described in accordance with the appended drawings, which are provided to illustrate, and not to limit the scope in any manner, wherein like designations denote similar elements, and in which.

DETAILED DESCRIPTION

Figure 1:
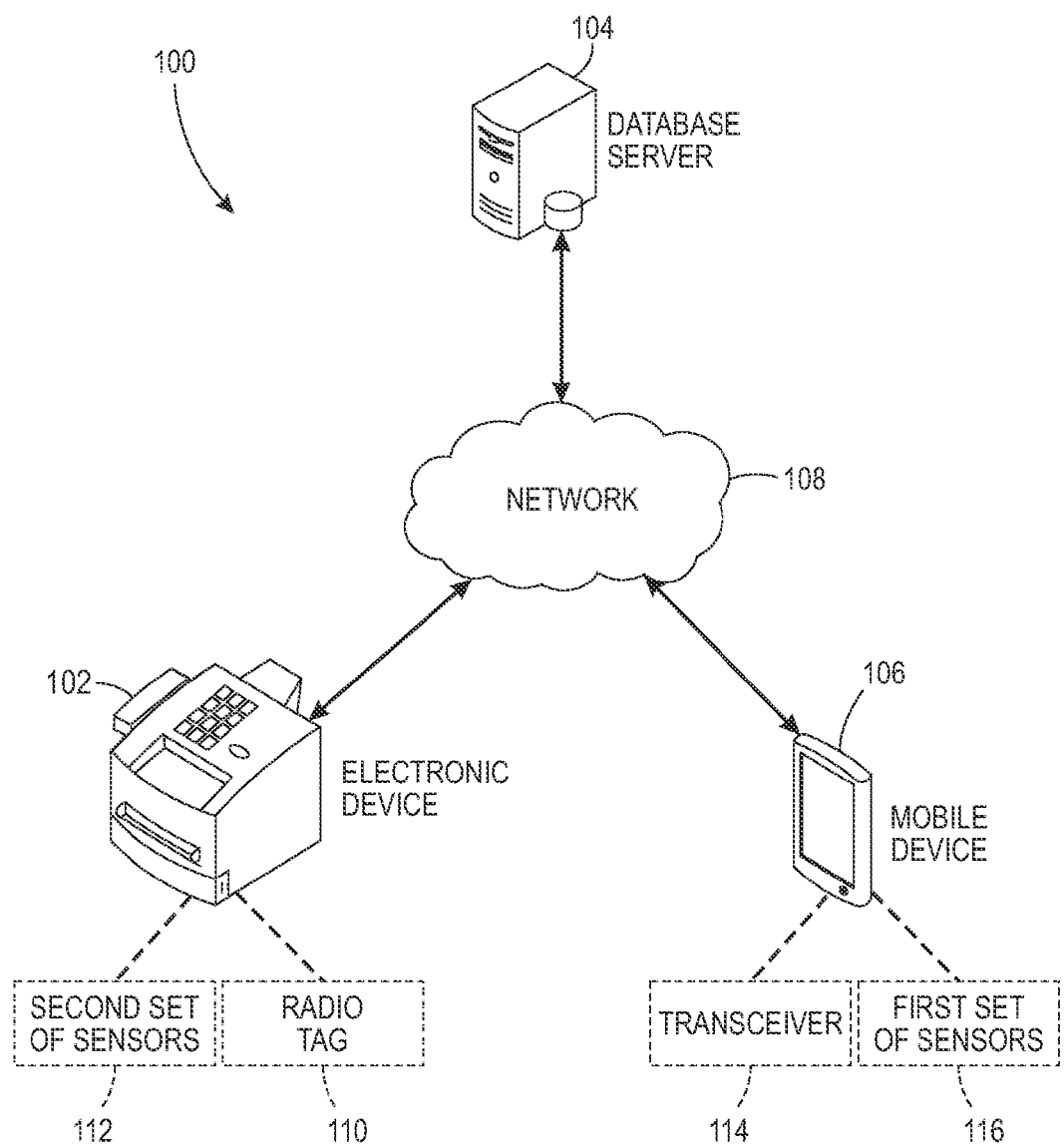
FIG. 1 is a block diagram illustrating a system environment in which various embodiments may be implemented.

The present disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternate and suitable approaches to implement the functionality of any detail described herein. Therefore, any approach may extend beyond the particular implementation choices in the following embodiments described and shown.

References to "one embodiment", "an embodiment", "at least one embodiment", "one example", "an example", "for example" and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

DEFINITIONS

The following terms shall have, for the purposes of this application, the respective meanings set forth below.

A "Multi-Function Device" (MFD) refers to a device that can perform multiple functions. Examples of the functions may include, but are not limited to, printing, scanning, copying, faxing, emailing, and the like. In an embodiment, the MFD includes a scanner and a printer for scanning and printing one or more documents respectively. In an embodiment, the MFD has communication capabilities that enable the MFD to send/receive data and messages in accordance with one or more communication protocols such as, but not limited to, FTP, WebDAV, E-Mail, SMB, NFS, and TWAIN.

"Application" refers to any executable file that works on/for an electronic device including, but not limited to, as a mobile phone, a tablet computer, a Portable Digital Assistant (PDA), an MFD, or a desktop computer, to perform a pre-determined operation.

"Blueprint" refers to an internal architecture of an electronic device. In an embodiment, the blueprint may correspond to various design and functional aspects of the electronic device. In an embodiment, the electronic device may correspond to an MFD. In an embodiment, the blueprint associated with an MFD may include information pertaining to location co-ordinates of various components of the MFD such as, but not limited to, a document feeder, a scanning tray, a paper path, a control panel, and so on. In an embodiment, the blueprint may include architectural, functional, structural, or design related information of one or more internal or external components of the electronic device. For example, if the electronic device corresponds to an MFD, the one or more internal components may include, but are not limited to, a document feeder, a scanner tray, a paper path, a xerographic platen, a control panel (including for e.g., a touch based user interface), and so on. Further, the one or more external components of the MFD may include, but are not limited to, a detachable document collecting tray, a network interface device (including for e.g., a network router), and so on.

"Identification Number" refers to a number or code assigned to a product for differentiating the product from other products belonging to a similar or a dissimilar product group/family. In an embodiment, an original equipment manufacturer (OEM) may assign the product an identification number that includes a model number to track the product through various stages of production, stocking, shipping, delivery, sale, technical support, and so on. For example, an MFD manufacturer (e.g., Xerox) assigns a unique code/identification number that corresponds to a model number to each MFD that it manufactures. In an embodiment, the blueprint of the electronic device (e.g., MFD) may include the identification number/model code of the electronic device "Reference location" refers to a pre-determined location earmarked for referencing purposes on an electronic device. In an embodiment, the reference location may be used to place a communication tag such as, but not limited to, a Bluetooth tag, an NFC tag, a RFID tag, and so on. In an embodiment, a mobile device may register with the communication tag at the reference location. Thereafter, the movement of the mobile device with respect to the reference location may be tracked through one or more sensors of the mobile device or the electronic device.

"Error code" refers to a notification or a message indicative of a problem or mal-function that has occurred or may occur on one or more components of an electronic device. In an embodiment, the blueprint of the electronic device may store an index of error codes and respective components affected by that error codes.

FIG. 1 is a block diagram illustrating a system environment 100 in which various embodiments may be implemented. The system environment 100 includes an electronic device 102, a database server 104, a mobile device 106, and a network 108. In an embodiment, the mobile device 106 may include a transceiver 114, and a first set of sensors 116. In an embodiment, the electronic device 102 may include a radio tag 110 and a second set of sensors 112.

In an embodiment, the electronic device 102 corresponds to a device that is configured to perform a predetermined operation. The electronic device 102 may include one or more components that enable the electronic device 102 to perform the predetermined operation. In a scenario, where the electronic device 102 corresponds to a multi-function device (MFD), the electronic device 102 may include a document feeder, a scanning tray, an output tray, an Ethernet port, etc. Such components may enable the electronic device 102 to print a document, scan a document, email the document, etc. A person having ordinary skill in the art would understand that the scope of the disclosure is not limited to the electronic device 102 being the MFD. In an embodiment, the electronic device 102 may correspond to any device that has one or more components, which may together perform the predetermined operation.

In an embodiment, the electronic device 102 includes the radio tag 110 at a predetermined location. In an embodiment, the radio tag 110 may be a wireless non-contact device that uses electromagnetic waves for data transfer. In an embodiment, the radio tag 110 includes the information pertaining to the identification number of the electronic device 102. For example, if the electronic device 102 corresponds to the MFD, the radio tag 110 includes the model number of the MFD. A person having ordinary skill in the art would understand that the scope of the disclosure is not limited to the radio tag 110 being built into the electronic device 102. In an embodiment, the radio tag 110 may be separate from the electronic device 102, however, being communicatively associated with the electronic device 102.

In an embodiment, the electronic device 102 may further include a second set of sensors 112 that may be used to detect an error or a malfunction in the electronic device 102. The electronic device 102 may transmit an error code corresponding to the error detected by the second set of sensors 112 to the database server 104.

Further, in an embodiment, the electronic device 102 may receive one or more user-inputs from the mobile device 106.

The functionality of the one or more components of the electronic device 102 may be controlled based on such user-inputs received from the mobile device 106. The electronic device 102 has been described later in conjunction with FIG. 5.

In an embodiment, the database server 104 is configured to store a blueprint (e.g., a model map or configuration details) of the electronic device 102. In an embodiment, the blueprint of the electronic device 102 includes coordinates of the pre-determined reference location (i.e., the location of the radio tag 110). Further, the blueprint may include the coordinates of the location of the one or more components of the electronic device 102. The database server 104 may receive a query from the mobile device 106 to extract the blueprint of the electronic device 102. In an embodiment, the mobile device 106 may utilize various querying languages such as SQL, QUEL, DMX and so forth to query the database server 104. Further, the database server 104 may be realized through various technologies such as, but not limited to, Microsoft® SQL server, Oracle, and My SQL, and may be connected to the mobile device 106 and the electronic device 102, using one or more protocols such as, but not limited to, ODBC protocol and JDBC protocol.

In an embodiment, the mobile device 106 is configured to control the operation of the electronic device 102. The mobile device 106 includes an application that is used for the controlling the electronic device 102. The mobile device 106 may further include the transceiver 114, which may be configured to receive information pertaining to the identification of the electronic device 102. In an embodiment, the mobile device 106 may query the database server 104 to receive the blueprint of the electronic device 102. The application installed on the mobile device 106 monitors the reading of the first set of sensors 116 to determine the location of the mobile device 106 with respect to the electronic device 102 based on the blueprint. Further, based on the location of the mobile device 106, the application in the mobile device 106 may determine which component of the electronic device 102 is being pointed at by the mobile device 106. Thereafter, the application may display the one or more functionalities that are associated with the component (of the electronic device 102) to the user. The user may provide inputs through the mobile device 106 to control the one or more functionalities associated with the component. In an embodiment, the mobile device 106 may correspond to a variety of computing devices, such as a laptop, a personal digital assistant (PDA), a tablet computer, and any other device that includes the first set of sensors 116. The mobile device 106 is described later in conjunction with FIG. 2.

In an embodiment, the network 108 may correspond to a medium through which content and messages flow between various devices of the system environment 100 (e.g., the electronic device 102, the database server 104, and the mobile device 106). Examples of the network 108 may include, but are not limited to, a Wireless Fidelity (Wi-Fi) network, a Wide Area Network (WAN), a Local Area Network (LAN), or a Metropolitan Area Network (MAN). Various devices in the system environment 100 can connect to the network 108 in accordance with the various wired and wireless communication protocols such as Transmission Control Protocol and Internet Protocol (TCP/IP), User Datagram Protocol (UDP), and 2G, 3G, or 4G communication protocols.

Figure 2:
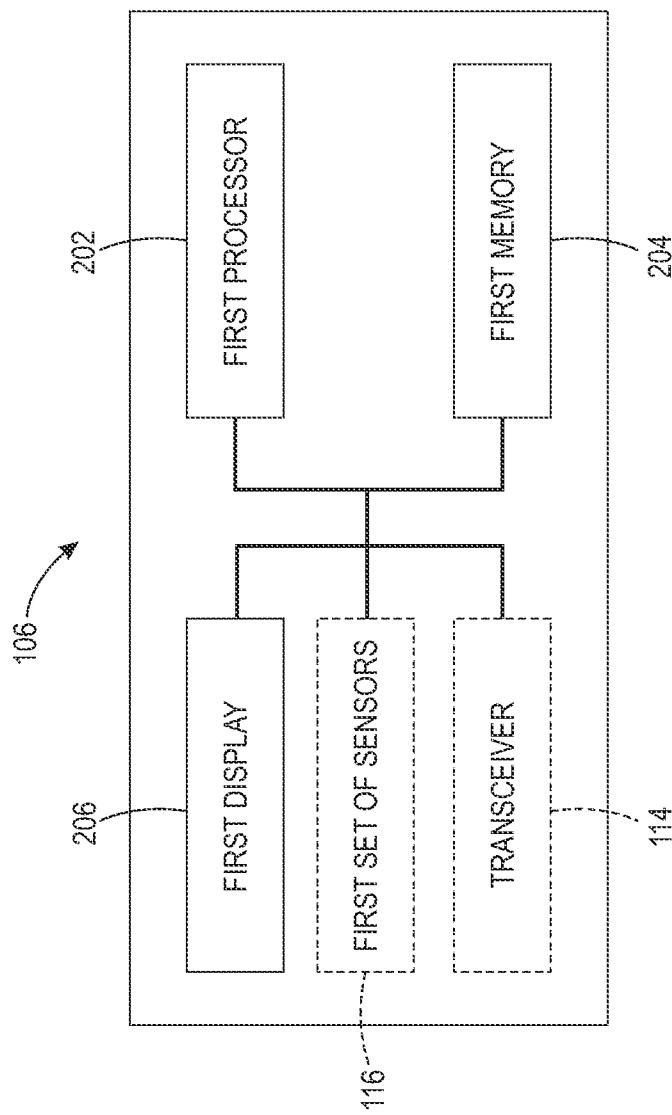
FIG. 2 is a block diagram illustrating a mobile device, in accordance with at least one embodiment.

FIG. 2 is a block diagram illustrating the mobile device 106, in accordance with at least one embodiment. The mobile device 106 includes the transceiver 114, the first set of sensors 116, a first processor 202, and a first memory 204.

The first processor 202 is coupled to the first memory 204 and the transceiver 114. The first processor 202 includes suitable logic, circuitry, and/or interfaces that are operable to execute one or more instructions stored in the first memory 204 to perform predetermined operation. The first memory 204 may be operable to store the one or more instructions. The first processor 202 may be implemented using one or more processor technologies known in the art. Examples of the first processor 202 include, but are not limited to, an X86 processor, a RISC processor, an ASIC processor, a CISC processor, or any other processor.

The first memory 204 stores a set of instructions and data. Some of the commonly known memory implementations include, but are not limited to, a random access memory (RAM), a read only memory (ROM), a hard disk drive (HDD), and a secure digital (SD) card. Further, the first memory 204 includes the one or more instructions that are executable by the first processor 202 to perform specific operations. It is apparent to a person having ordinary skills in the art that the one or more instructions stored in the first memory 204 enables the hardware of the mobile device 106 to perform the predetermined operation.

The transceiver 114 transmits and receives messages and data to/from various components of the system environment 100. Examples of the transceiver 114 may include, but are not limited to, an antenna, an Ethernet port, an USB port, or any other port that can be configured to receive and transmit data. The transceiver 114 transmits and receives data/messages in accordance with the various communication protocols, such as, TCP/IP, UDP, and 2G, 3G, or 4G communication protocols. In an embodiment, the transceiver 114 is a radio transceiver configured to receive data from the radio tag 110 on the electronic device 102 in accordance with various communication protocols such as near field communication (NFC) standard, RFID standard, Bluetooth, etc. A person having ordinary skill in the art would understand that the scope of the disclosure is not limited to having a single antenna for both communication with the network 108 and the radio tag 110. In an embodiment, the mobile device 106 may include a separate antenna for the transmission and reception of data from the radio tag 110.

A first display 206 displays a user interface to the user of the mobile device 106. In an embodiment, the first display 206 may be realized through various technologies known in the art such as LED, Edge LED, TFT, and LCD display. In an embodiment, the first display 206 may further include means to receive input from the user. In such a scenario, the first display 206 includes touch sensitive layer (either capacitive or resistive layer) to receive input from the user.

The first set of sensors 116 is configured to monitor the movement of the mobile device 106. In an embodiment, the first set of sensors 116 may include at least one of a gyroscope, an accelerometer, a compass, etc. In an embodiment, the readings of the first set of sensors 116 may determine the location of the mobile device 106 with respect to the electronic device 102. In an embodiment, the first set of sensors 116 may further include an image-capturing device that may be configured to capture an image of the component of the electronic device 102. Further, the first set of sensors 116 may include a microphone that is used for capturing voice events.

The operation of the mobile device 102 has been described later in conjunction with FIG. 3.

Figure 3:
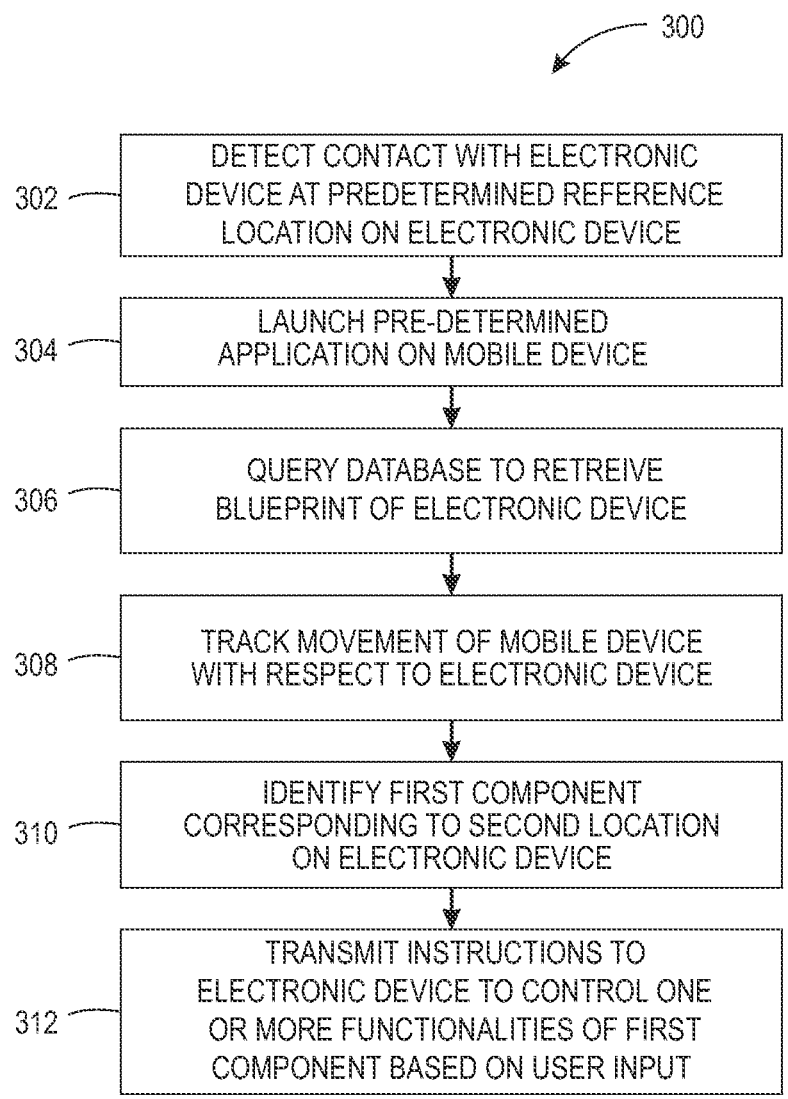
FIG. 3 is a flowchart illustrating a method for controlling an electronic device, in accordance with at least one embodiment.

FIG. 3 is a flowchart 300 illustrating a method for controlling the electronic device 102, in accordance with at least one embodiment. The flowchart 300 has been described in conjunction with FIG. 1 and FIG. 2.

At step 302, a contact with the electronic device 102 is detected at a predetermined location. In an embodiment, the first processor 202 detects the contact with the electronic device 102. In an embodiment, the user of the mobile device 106 may bring the mobile device 106 in a vicinity of the radio tag 110 on the electronic device 102. As discussed above, the radio tag 110 may correspond to at least one of a Bluetooth tag, an RFID tag, or an NFC tag. In case the radio tag 110 is a Bluetooth tag, the first processor 202 identifies the Bluetooth tag through the transceiver 114, when the mobile device 106 is brought in vicinity of the Bluetooth tag. Further, the first processor 202 receives at least the information pertaining to the identification of the electronic device 102 from the Bluetooth tag.

In a scenario, where the radio tag 110 corresponds to the RFID tag or the NFC tag, the user of the mobile device 106 may need to tap on the mobile device 106 onto the radio tag 110. On contact with the electronic device 102, the first processor 202 receives the information pertaining to the identification of the electronic device 102 from the radio tag 110. A person having ordinary skill in the art would understand that the contact with the radio tag 110 may not be necessary. In an embodiment, the first processor 202 may receive the information from the radio tag 110 by bringing the mobile device 106 in close proximity of the radio tag 110.

At step 304, predetermined application is launched on the mobile device 106 based on the contact with the electronic device 102. In an embodiment, the first processor 202 launches the predetermined application. In an embodiment, along with the information pertaining to the identification of the electronic device 102, the first processor 202 receives metadata of the predetermined application to be launched on the mobile device 106. Thereafter, the first processor 202 may determine if the predetermined application is already installed on the mobile device 106. If the predetermined application is not already installed on the mobile device 106, in an embodiment, the first processor 202 may direct the user to navigate to an application store, download the predetermined application, and thereafter install it on the mobile device 106. In an embodiment, the first processor 202 may automatically download the predetermined application from the application store and install it on the mobile device 106. If the first processor 106 determines that the predetermined application is already installed on the mobile device 106, the first processor 202 launches the application.

In an alternate embodiment, the mobile device 106 may not have the capability to communicate with the radio tag 110 on the electronic device 102. In such a scenario, the user of the mobile device 106 may manually launch the predetermined application. Thereafter, the user may tap the mobile device 106 at the predetermined location on the electronic device 102. The first processor 202 may detect the tap through the microphone of the mobile device 106. In an embodiment, the predetermined application enables the first processor 202 to detect the tap through the microphone of the mobile device 106. On detection of the tap, the predetermined application displays an interface to the user, where the user can manually input the details pertaining to the identification number/model number of the electronic device 102.

At step 306, the database server 104 is queried to retrieve the blueprint of the electronic device 102. In an embodiment, the first processor 202 queries the database server 104. In an embodiment, the identification number received from the radio tag 110 (step 302) is transmitted to the database server 104. Further, the database server 104 may maintain an index of the identification number and corresponding blueprint of the electronic device 102. The first processor 202 may receive the blueprint of the electronic device 102 from the database server 104, based on a lookup performed by the database server 104 from the index.

In an embodiment, the blueprint of the electronic device 102 may include information pertaining to the dimensions of the electronic device 102, location of the one or more components in the electronic device 102, design and dimensions of the one or more components. Additionally, the blueprint of the electronic device 102 includes distance of the one or more components from the predetermined reference location on the electronic device 102. As discussed above, the radio tag 110 is attached to the predetermined reference location. In an alternate embodiment, the coordinates of the one or more components are present in the blueprint with the reference location as the origin. Following table illustrates an example of coordinates of the one or more components on the electronic device 102:

TABLE 1

Coordinates of one or more components on the electronic device

| Components | Coordinates | Displacement from the reference location |
| --- | --- | --- |
| Component-1 | (126, 90, 50) | 30 cm |
| Component-2 | (126, −90, 25) | 25 cm |
| Component-3 | (−30, 75, 0) | 25 cm |
| Component-4 | (−126, −90, 25) | 35 cm |

From Table 1 it can be observed that the component-1 of the electronic device 102 is present at the coordinate (126, 90, 50) with the predetermined reference location as the origin (0, 0, 0). Further, the displacement of the component-1 from the reference location is 30 cm. Similarly, the component-2 of the electronic device 102 is placed at the coordinates (126, −90, 25). Further, the displacement of the component-2 from the reference location is 25 cm. An example blueprint of the electronic device 102 has been described in conjunction with FIG. 4.

At step 308, the movement of the mobile device 106 is tracked with respect to the electronic device 102. In an embodiment, the first processor 202 tracks the movement of the mobile device 106 by monitoring the reading of the first set of sensors 116. In an embodiment, the first set of sensors 116 may include an accelerometer and a gyroscope that are used to track the movement of the mobile device 106 with respect to the electronic device 102. In an embodiment, the accelerometer is used for measuring the acceleration of the mobile device 106 in a particular direction, while, the gyroscope is used for determining the torque in that direction.

The first processor 202 monitors the reading of the first set of sensors 116 to determine the direction in which the mobile device 106 is being displaced from the reference location. In an embodiment, the user may displace the mobile device 106 from the reference location to a second location. The first processor 202 determines coordinates of the second location of the mobile device 106 based on the readings of the first set of sensors 116. In an embodiment, the readings of the first set of sensors 116 may be converted to the co-ordinates corresponding to the second location by utilizing any technique known in the art.

At step 310, a first component, corresponding to the second location on the electronic device 106, is identified. In an embodiment, the first processor 202 may identify the first component. As determined in the step 308, the coordinates of the second location are determined. The first processor 202 compares the coordinates of the second location with the blueprint of the electronic device 102. Based on the comparison, the first processor 202 identifies the first component. For example, the first processor 202 determines that the mobile device 106 is at coordinates (−30, 75, 0), i.e., the second location. The first processor 202 may determine that the mobile device 106 is at the location corresponding to the component-3 (refer Table 1).

In an alternate embodiment, the first processor 202 determines the displacement of the mobile device 106 from the reference location. In an embodiment, the first processor 202 may determine the displacement based on the readings of the first set of sensors 116. In an embodiment, the first processor 202 may employ known techniques to convert the readings of the first set of sensors 116 to the displacement from the reference location. In an embodiment, the first processor 202 may determine the readings of the first set of sensors 116 at the reference location. Thereafter, the first processor 202 may determine the readings of the first set of sensors 116 at the second location. By comparing the reading of the first set of sensors 116 at the reference location and the second location, the first processor 202 may determine the displacement of the mobile device 106 from the reference location.

Post determining the displacement of the mobile device 106 from the reference location, the first processor 202 may refer to the blueprint of the electronic device 102 to determine the component near/at which the mobile device 106 may be present.

In another alternate embodiment, the first processor 202 utilizes the image-capturing device in the first set of sensors 116 to capture the image of the electronic device 102 at the second location. In an embodiment, the captured image may include image of a component of the electronic device 102. The first processor 202 extracts the images of the one or more components associated with the electronic device 102 from the blueprint. Thereafter, the first processor 202 compares the captured image with the images of the one or more components. Based on the comparison, the first processor 202 determines which of the one or more components corresponds to the component in the captured image, i.e., the first component. In an embodiment, the first processor 202 may employ one or more image-processing techniques such SIFT, pattern-match algorithms to compare the captured images with the images of the one or more components.

At step 312, instructions to control the one or more functionalities of the first component are transmitted to the electronic device 102. In an embodiment, the first processor 202 transmits the instructions to the electronic device 102 through the transceiver 114. Prior to transmitting the one or more instructions, the first processor 202 queries the database server 104 to determine the one or more functionalities of the identified first component. In alternate embodiment, the first processor 202 may determine the functionality of the first component from the blueprint of the electronic device 102. The blueprint of the electronic device 102 has been described later in conjunction with FIG. 4.

Thereafter, the first processor 202 displays the one or more functionalities of the first component to the user. The user may provide the input to the mobile device 106 to select a functionality that is to be controlled. Accordingly, an instruction is transmitted to the electronic device 106 over the network 108. In an embodiment, the mobile device 106 may transmit an instruction to control the functionalities associated with the first component using SNMP protocol. A person having ordinary skill in the art would understand that the transmission of instructions over the network 108 may be different from the reception of information from the radio tag 110. However, scope of the disclosure is not limited to transmitting instructions over the network 108. In an embodiment, the instructions may be transmitted to the electronic device 108 through the radio tag 110. In such a scenario, the mobile device 106 may be brought in vicinity of the radio tag 110. Thereafter, the predetermined application, which is installed on the mobile device 106, may present an option to the user to transmit the instruction. On receiving input (pertaining to transmitting instruction over the radio tag 110) from the user, the instructions are transmitted to the electronic device 102.

In an embodiment, where the mobile device 106 does not have the capability to communicate with the radio tag 110, the mobile device 106 may transmit the instruction over the network 108.

Figure 4:
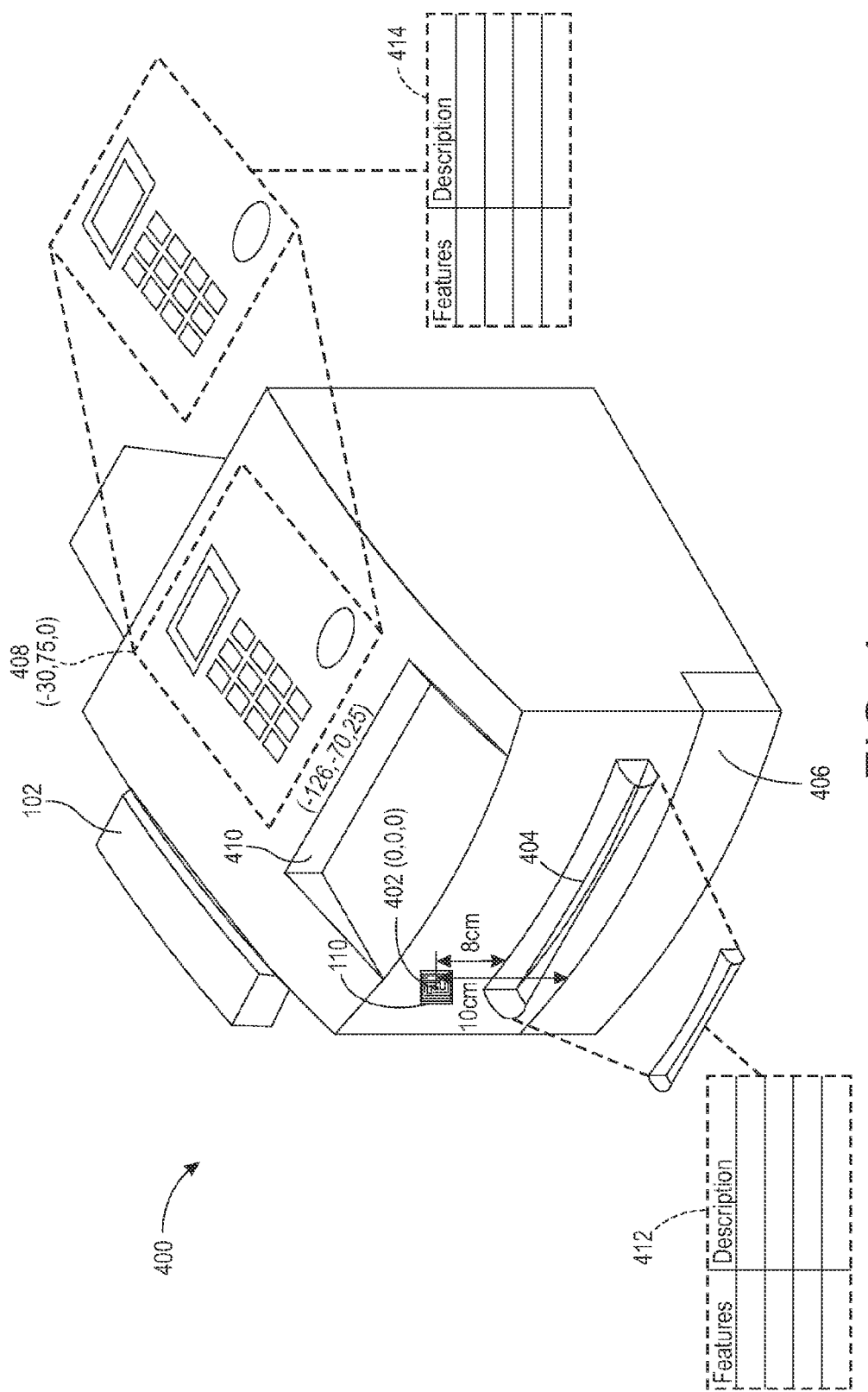
FIG. 4 is a blueprint of an electronic device, in accordance with at least one embodiment.

FIG. 4 is a blueprint 400 of the electronic device 102, in accordance with at least one embodiment. The blueprint 400 of the electronic device 102 has been described in conjunction with FIG. 1, FIG. 2, and FIG. 3.

The blueprint 400 of the electronic device 102 includes the reference location 402 at which the radio tag 110 is connected to the electronic device 102. Further, the blueprint 400 includes the component-1 (depicted by 404), the component-2 (depicted by 406), the component-3 (depicted by 408) and the component-4 (depicted by 410). The component-1 (depicted by 404) of the electronic device 102 is at a displacement of 8 cm from the reference location 402. Similarly, the component-2 (depicted by 406) is at a displacement of 10 cm from the reference location 402.

As discussed above, the blueprint 400 may further include information pertaining to the coordinates of the one or more components with respect to the reference location 402. For example, the coordinates of the component-3 (depicted by 408) are (−30, 75, 0) with respect to the reference location 402 as the origin (i.e., the coordinates of the reference location are (0, 0, 0)). Similarly, the coordinates of the component-4 (depicted by 410) is (−126, −70, 25).

In an embodiment, the blueprint 400 may further include functionalities of the one or more components in the electronic device 102. For example, table 412 in the blueprint includes the functionality of the component-1 (depicted by 404). Similarly, table 414 depicts the functionalities of component-3 (depicted by 408).

A person having ordinary skill in the art would understand that though the blueprint 400 has been illustrated to display one or more external components of the electronic device 102, scope of the disclosure is not limited to the displaying the one or more external components. In an embodiment, the blueprint 400 may further include an index of one or more internal components of the electronic device 102 along with their respective displacement from the reference location 402 and their respective functionalities.

In another alternate embodiment, the blueprint 400 may be utilized as a user manual of the electronic device 102. In an embodiment, the mobile device 102 may utilize the blueprint as an interactive user manual for the user to operate the electronic device 102. In an embodiment, the interactive user manual of the electronic device 102 has been described later in conjunction with FIG. 6.

Figure 5:
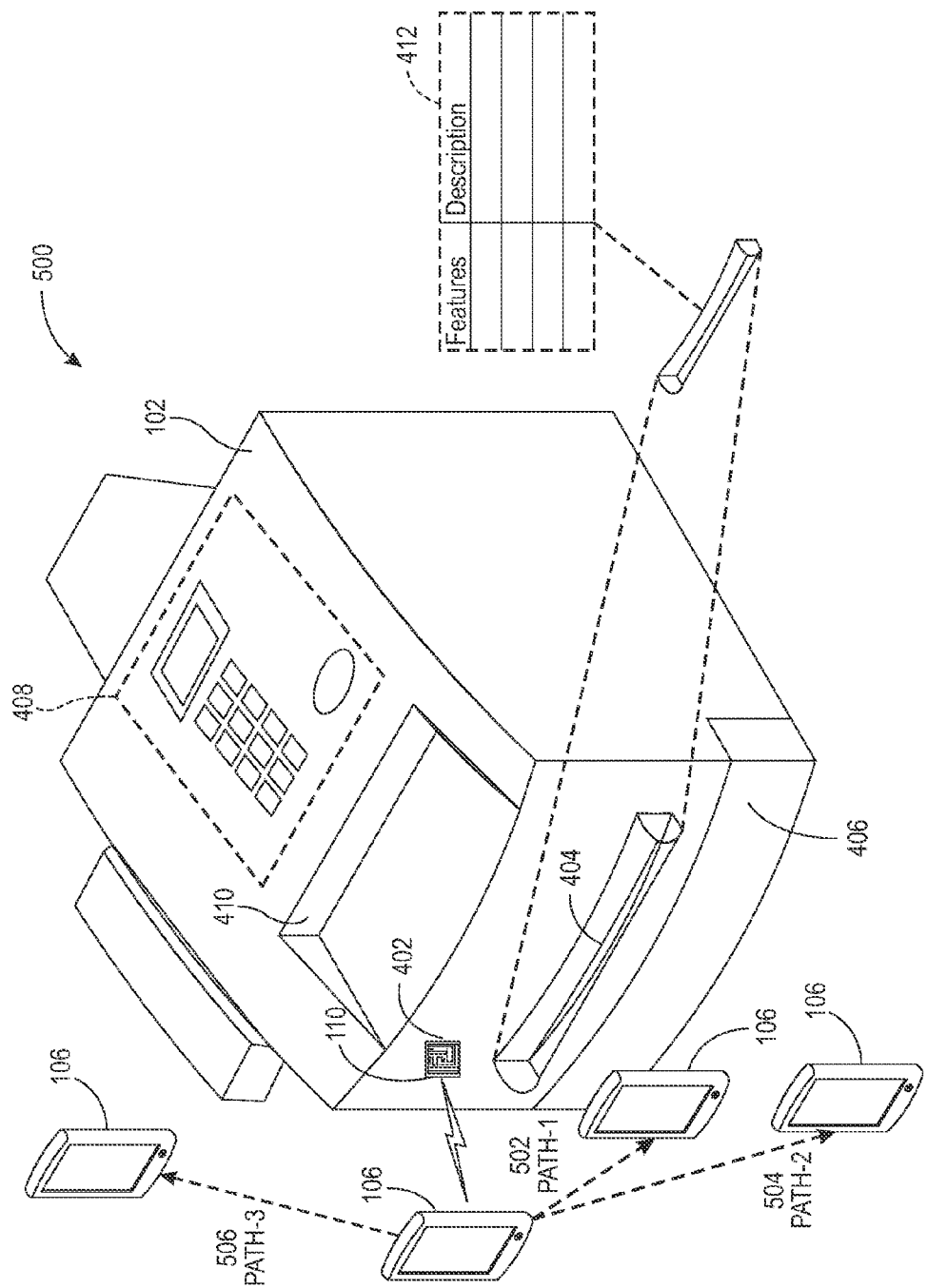
FIG. 5 is a block diagram illustrating an electronic device, in accordance with at least one embodiment.

FIG. 5 is a block diagram 500 of illustrating a movement of the mobile device 106 with respect to the electronic device 102, in accordance with at least one embodiment. The block diagram 500 is described in conjunction with FIG. 1, FIG. 2, FIG. 3 and FIG. 4.

The block diagram 500 includes a mobile device 106 and the electronic device 102. The mobile phone 106 is initially brought in vicinity of the reference location 402. As discussed above, the reference location 402 may include a radio tag 110 from which the mobile device 106 may receive information pertaining to the identification of the electronic device 102. The mobile device 102 may obtain the blueprint of the electronic device 102 from the database server 104 based on the identification of the electronic device 102. On receiving the blueprint, the mobile device 102 may traverse any of the path-1, the path-2, or the path-3 (depicted by 502, 504, 506 respectively) to reach the component-1 (depicted by 404), component-2 (depicted by 406), component-4 (depicted by 410), respectively.

For example, the mobile device 106 is made to traverse the path-2 (depicted by 504) to the component-2 (depicted by 406). The first set of sensors 116 in the mobile device 106 may monitor the movement of the mobile device 106 to the location of the component-2 (depicted by 406). The mobile device 106 converts the readings of the first set of sensors 116 to the coordinates of the corresponding location. Thereafter, the mobile device 106 compares the coordinates of the location of the mobile device 106 with the coordinates in the blueprint. In an embodiment, based on the comparison, the mobile device 106 determines that the mobile device 106 is at the location of the component-2 (depicted by 406). Thereafter, the mobile device 106 may retrieve the functionalities of the component-2 (depicted by 406) from the blueprint. The functionalities of the component-2 are displayed on the first display 206 of the mobile device 106. The user of the mobile device 106 may provide input to the mobile device 106 to control the functionalities of the component-2 (depicted by 406).

Figure 6:
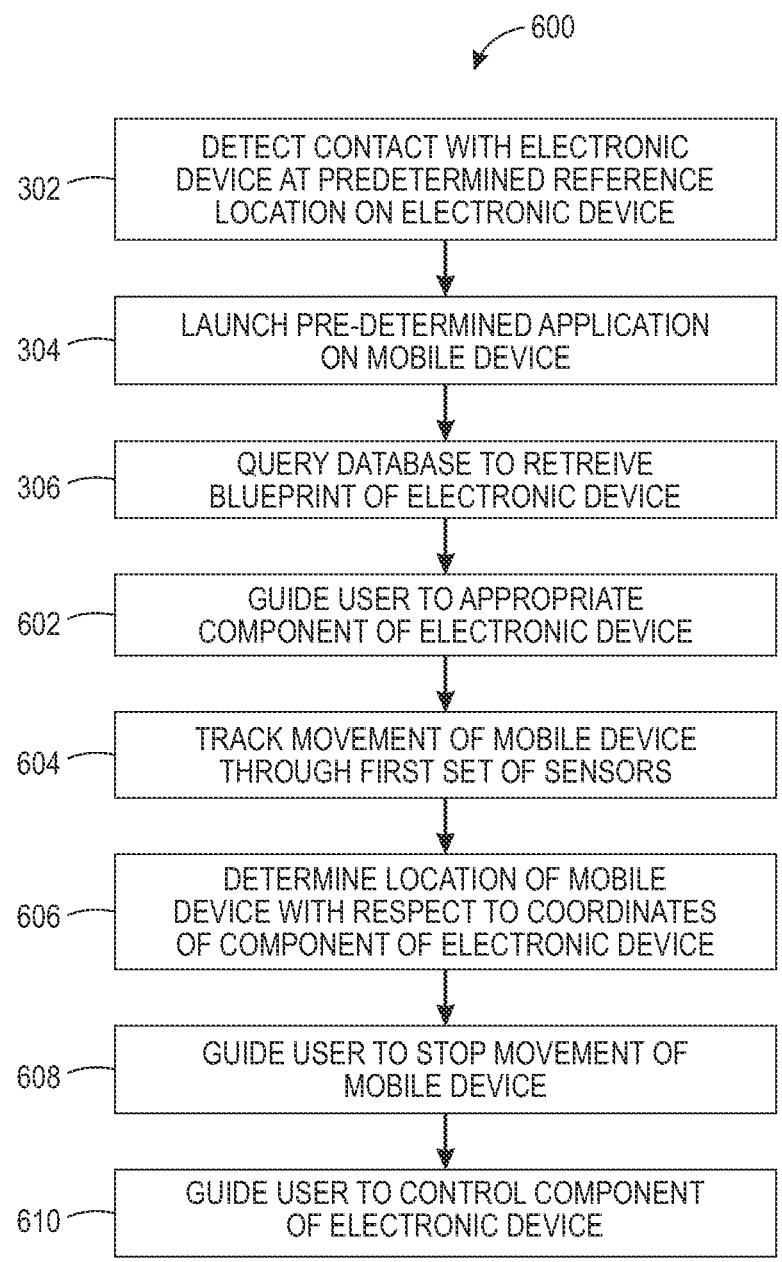
FIG. 6 is a flowchart illustrating a method to operate a mobile device as a user manual of an electronic device, in accordance with at least one embodiment.

FIG. 6 is a flowchart 600 illustrating a method to operate the mobile device 106 as the user manual of the electronic device 102, in accordance with at least one embodiment. The flowchart 600 has been described in conjunction with FIG. 1, FIG. 2, FIG. 3, FIG. 4, and FIG. 5.

At step 302, the contact with the electronic device 102 is detected at the predetermined location. In an embodiment, the first processor 202 detects the contact with the electronic device 102. As discussed above, the information pertaining to the identification of the electronic device 102 is received from radio tag 110. At step 304, the predetermined application is launched by the first processor 202. At step 306, the database server 104 is queried to retrieve the blueprint 400 of the electronic device 102.

Post retrieval of the blueprint 400, the first processor 202 may display the user with a list of components of the electronic device 102. The user may select a component from the list of components to control the component.

At step 602, the first processor 202 displays a visual on the first display 206 indicative of the direction to guide the user to the component of the electronic device 102. For example, the first processor 202 may display a right arrow on the first display 206 that indicates that the user has to move the mobile phone 106 in the right direction. In an alternate embodiment, the first processor 202 may output an audio signal through a speaker (not shown) that may guide the user to the component. For example, the first processor 202 may output the audio signal "Right" that may guide the user to move the mobile device 106 in the right direction.

A person having ordinary skill in the art would understand that the scope of the disclosure is not limited to displaying direction symbols or outputting the audio signals to guide the user to the component. In an embodiment, any other means such as haptic feedback can be used to guide the user to the component.

At step 604, the first set of sensors 116 are monitored. In an embodiment, the first processor 202 monitors the first set of sensors 116. Simultaneously, the first processor 202 determines the location (i.e., coordinates) of the mobile device 106 based on the readings of the first set of sensors 116.

At step 606, the determined location of the mobile device 106 is compared to the coordinates of the component to which the user is being guided. In an embodiment, the first processor 200 compares the coordinates of the mobile device 106 with the coordinates of the component. If the first processor 202 determines that the coordinates of the location of the mobile device 106 is same as the location of the component, step 608 is performed, otherwise step 602 is repeated.

At step 608, the user of the mobile device 106 is instructed to stop the movement of the mobile device 106. In an embodiment, the first processor 202 instructs the user through the first display 206 or the audio output signal. At step 610, instructions are displayed to the user to control the component. In an embodiment, the first processor 202 displays the instructions on the first display 206.

In an alternate embodiment, the first processor 202 may retrieve a video from the database server 104 (by querying the database server 104) that is indicative of the functionality of the component. In an embodiment, the first processor 202 may display the retrieved video content to the user. Similarly, the first processor 202 may guide the user to other components in the electronic device 102.

Figure 7:
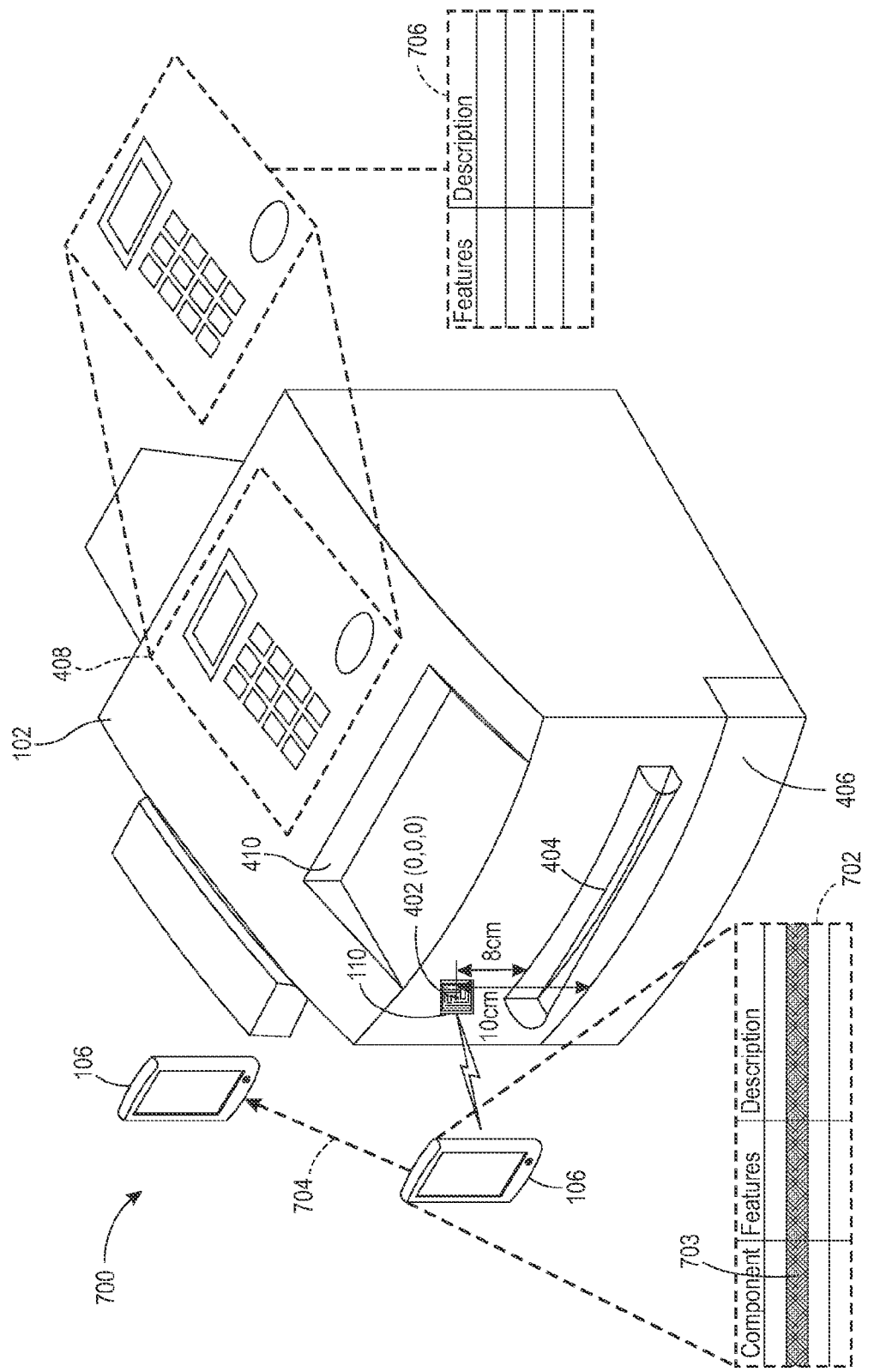
FIG. 7 is a block diagram illustrating a movement of a mobile device with respect to an electronic device, in accordance with at least one embodiment.

FIG. 7 is a block diagram 700 illustrating the movement of the mobile device 106 with respect to the electronic device 102, in accordance with at least one embodiment. The block diagram 700 has been described in conjunction with FIG. 1 through FIG. 6.

The block diagram 700 includes the electronic device 102 and the mobile device 106. As discussed above, the mobile device 106 is contacted with the electronic device 102 at the predetermined reference location 402. Thereafter, the mobile device 106 receives the information pertaining to the identification of the electronic device 102 from the radio tag 110 at the predetermined reference location 402. The mobile device 106 utilizes the identification information to retrieve the blueprint of the electronic device 102 from the database server 104.

Thereafter, the mobile device 106 displays a list of the one or more components (depicted by 702) associated with the electronic device 102. The mobile device 106 may receive an input from the user to select the component from the list of the components. Post the selection of the component, the mobile device 106 assists the user to move the mobile device 106 from the reference location 402 to the selected component (depicted by 703) along a path 704. In an embodiment, the mobile device 106 may display a direction in which the mobile device 106 has to be moved. In an alternate embodiment, the mobile device 106 may generate an audio signal that may direct the user to move along the path 704.

Once the mobile device 106 reaches the location of the component, the mobile device 106 displays the user with one or more options to control the functionalities of the component (depicted by 706). In another embodiment, the mobile device 106 may display a video content to the user. In an embodiment, the video content is indicative of the functionality of the component.

Figure 8:
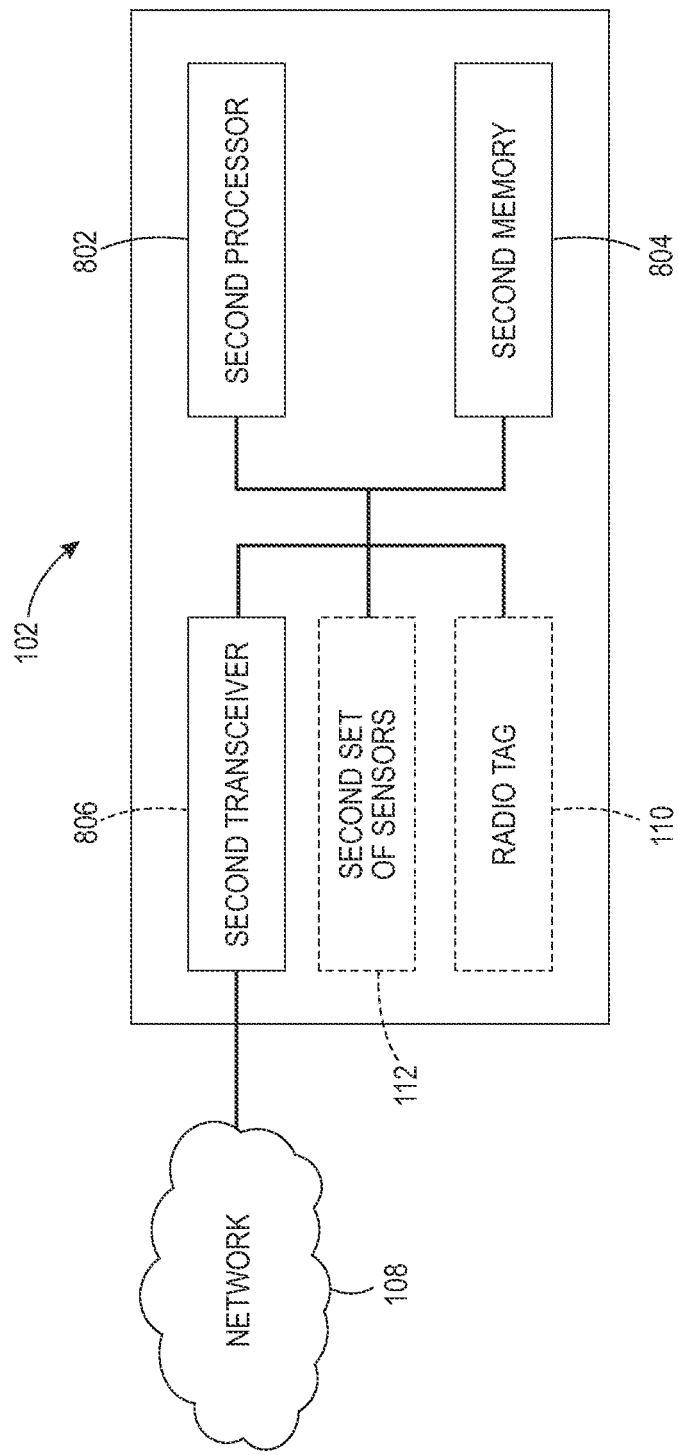
FIG. 8 is a block diagram of an electronic device, in accordance with at least one embodiment.

FIG. 8 is a block diagram of the electronic device 102, in accordance with at least one embodiment. The electronic device 102 includes a second processor 802, a second memory 804, a second transceiver 806, the second set of sensors 112, and the radio tag 110.

In an embodiment, the second processor 802 is similar to the first processor 202. Further, the embodiments applicable to the first processor 202 are also applicable on the second processor 802.

In an embodiment, the second memory 804 is similar to the first memory 204. Further, the embodiments applicable to the first memory 204 are also applicable on the second memory 804.

The second transceiver 806 transmits and receives messages and data to/from various components of the system environment 100. Examples of the second transceiver 806 may include, but are not limited to, an antenna, an Ethernet port, a USB port or any other port that can be configured to receive and transmit data. The second transceiver 806 transmits and receives data/messages in accordance with the various communication protocols, such as, TCP/IP, UDP, and 2G, 3G, or 4G communication protocols.

The radio tag 110 is coupled to the electronic device 102 that is used for transmitting data to the mobile device 102. In an embodiment, the radio tag 110 utilizes radio-frequency electromagnetic fields to transmit the data. In an embodiment, the radio tag 110 may correspond to at least one of a NFC tag, an RFID tag, or a Bluetooth tag. In an embodiment, the radio tag 110 includes information pertaining to the identification of the electronic device 102. Further, the radio tag 110 includes metadata of the application to be launched. In an embodiment, when the mobile device 106 is in proximity of the radio tag 110, the identification information and the metadata of the application are transmitted to the mobile device 106. In an embodiment, the metadata associated with application may include name of the application, link to download the application from the application store.

The second set of sensors 112 are installed in the electronic device 102 to monitor the functionality/operation of the electronic device 102. In an embodiment, the second set of sensors 112 may include motion sensors, proximity sensors, etc. Based on the readings of the second set of sensors 112, the second processor 802 determines if the electronic device 102 is operating as per the norms. In an embodiment, the norms may be specified within the blueprint. If the second processor 802 determines that the electronic device 102 is operating as per the norms, the second processor 802 may generate an error code indicative of the type of problem or malfunction affecting the electronic device 102. In an embodiment, the second processor 802 may generate the error code based on the readings of the second set of sensors 112. In an embodiment, the error code may be utilized by the user of the electronic device 102 to troubleshoot the malfunction. The troubleshooting of the error has been described later in conjunction with FIG. 10.

The operation of the electronic device 102 has been described later in conjunction with FIG. 9 and FIG. 10.

Figure 9:
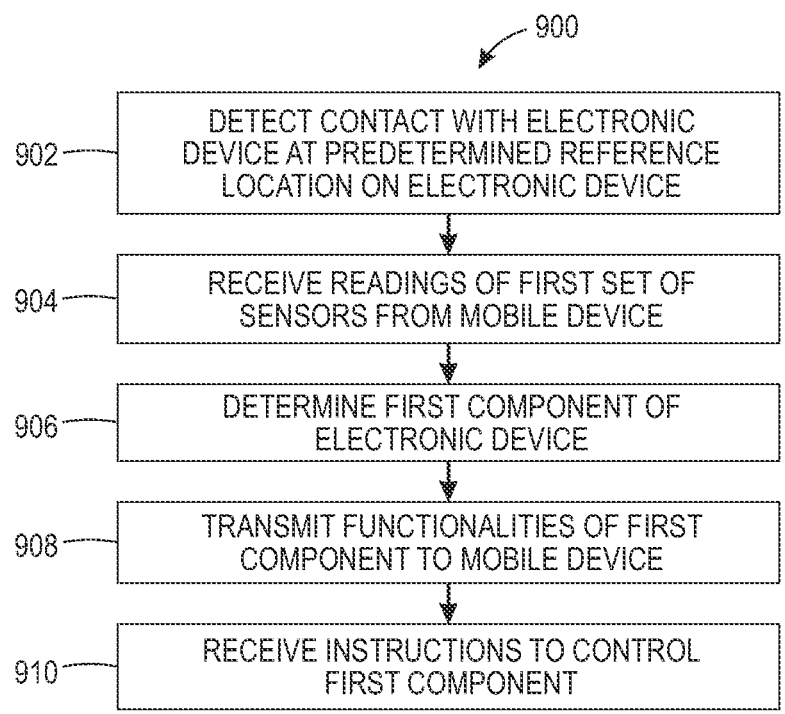
FIG. 9 is a flowchart illustrating a method to operate an electronic device, in accordance with at least one embodiment.

FIG. 9 is a flowchart 900 illustrating a method to operate the electronic device 102, in accordance with at least one embodiment.

At step 902, the contact of the mobile device 106 with the electronic device 102 is detected. In an embodiment, the second processor 802 detects the contact. The second processor 802 may receive a notification, from the radio tag 110, indicative of the detection of the contact.

At step 904, readings of the first set of sensors 116 are received from the mobile device 106. In an embodiment, the second processor 802 receives the readings of the first set of sensors 116 through the second transceiver 806. Prior to receiving the readings of the first set of sensors 116, the second processor 802 establishes a connection with the mobile device 106. In an embodiment, the details pertaining to the connection with the mobile device 106 are transmitted to the mobile device 106 through the radio tag 100 along with the information pertaining to the identification of the electronic device 102. In an embodiment, the details pertaining to the connection include at least one of the authentication details (e.g., WPA, WEP authentication details), a protocol to be used for the connection (such as IEEE 802.11, 802.16, etc.), an IP address of the electronic device 102, or an IP address of the mobile device 106.

Once the connection is established between the electronic device 102 and the mobile device 106, the second processor 802 receives the readings of the first set of sensors 116 in the mobile device 106 periodically. In an embodiment, any change in the readings of the first set of sensors 116 may be indicative of the movement of the mobile device 106 from the predetermined reference location. In an embodiment, the second processor 802 tracks the movement of the mobile device 106 based on the change in the readings of the second set of sensors 112.

At step 906, the first component of the electronic device 106 is determined. In an embodiment, the second processor 802 determines the first component. In an embodiment, the user of the mobile device 106 may move the mobile device 106 from the predetermined reference location to the second location on the electronic device 106. As described above, the movement of the mobile device 106 is tracked by the second processor 802. The change in two successive readings of the first set of sensors 116 indicates that the mobile device 106 is in motion. If the second processor 802 determines that two successive readings of the first set of sensors 116 are the same, the second processor 802 may determine that the mobile device 106 is stationary and may consider the location of the mobile device 106 as the second location.

The second processor 802 may convert the readings of the first set of sensors 116 to the corresponding coordinates. Thereafter, the second processor 802 compares the coordinates of the second location with the coordinates of the one or more components of the electronic device 102. In an embodiment, the second processor 802 may refer to the blueprint of the electronic device 102 in the second memory 804. In an embodiment, the blueprint of the electronic device 102 is retrieved from the database server 104.

At step 908, the functionalities of first component are transmitted to the mobile device 106. In an embodiment, the second processor 802 transmits the functionalities of the first component. At step 910, one or more instructions are received to control the functionality of the first component. In an embodiment, the second processor 802 receives the instructions from the mobile device 106 to control the functionality of the first component.

Figure 10:
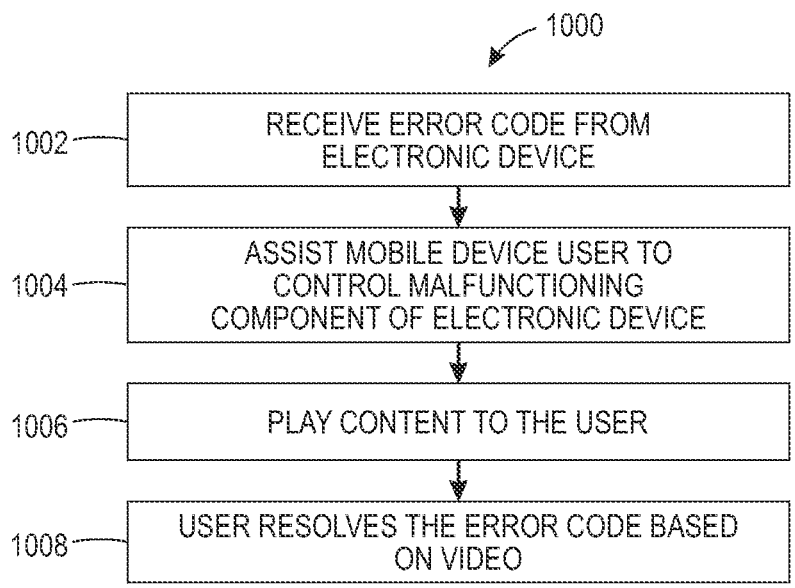
FIG. 10 is a flowchart illustrating a method for troubleshooting an electronic device, in accordance with at least one embodiment.

FIG. 10 is a flowchart 1000 illustrating a method for troubleshooting the electronic device 102, in accordance with at least one embodiment. The flowchart 1000 is described in conjunction with FIGS. 1-9.

At step 1002, an error code is received. In an embodiment, the first processor 202 receives the error code from the electronic device 102. Prior to receiving the error code from the electronic device 102, the first processor 202 performs steps 302-306.

A person having ordinary skill in the art would understand that the error code is received only if the electronic device 102 is malfunctioning. In an embodiment, the second processor 802 detects the malfunctioning based on the readings of the second set of sensors 112. On receiving the error code, the first processor 202 refers to the blueprint of the electronic device 102 to identify a second component that may be malfunctioning. In an embodiment, the blueprint may include an index of the error codes that includes the error code and the corresponding component that may have malfunctioned. Following table illustrates an example index:

TABLE 2

Error code and corresponding malfunctioning components

| Error code | Malfunctioning component | Location of the component |
|---|---|---|
| Error code-1 | Component-1 | (125, 30, 0) |
| Error code-2 | Roller-1 | (26, 30, 0) |
| Error code-3 | Gear-2 | (24, 25, 2) |

Referring to Table 2, if the first processor 202 receives the error code as "Error code-2", the first processor 202 may determine that the component-1 is malfunctioning. Similarly, if the first processor 202 receives the error code as "Error code-2", the first processor 202 may determine that Roller-2 in the electronic device 102 is malfunctioning.

At step 1004, the user of the mobile device 106 is assisted to navigate to the malfunctioning component of the electronic device 106. In an embodiment, the first processor 202 assists the user of the mobile device 106. As discussed in conjunction with FIG. 7, first processor 202 may display directions to the user in which the user has to move the mobile device 106. In another embodiment, the first processor 202 may generate the audio signal that may assist the user of the mobile device 106 to move the mobile device 106 in the particular direction.

In an embodiment, the first processor 202 may monitor the readings of the first set of sensors 116 to determine the location of the mobile device 106. In an embodiment, the first processor 202 converts the readings of the first set of sensors 116 to the corresponding Cartesian coordinates to determine if the mobile device 106 has reached to the location of the malfunctioning component. If the first processor 202 determines that the mobile device 106 is being navigated in the wrong direction, the direction that is being displayed to the user on the first display 206 is altered in real-time. The step 1004 may be repeated until the mobile device 106 is at the location of the malfunctioning component.

At step 1006, a content is played to the user. In an embodiment, the first processor 202 plays the content to user. In an embodiment, the content corresponds to an image of at least the internal component of the electronic device 102. A person having ordinary skill in the art would understand that the content displaying at least the internal component of the electronic device 102 is displayed only if the internal component is malfunctioning. In an embodiment, the first processor 202 retrieves the content from the blueprint of electronic device 102. In an embodiment, the content being played by the first processor 202 may correspond to at least a video to resolve the error code.

For example, the electronic device 102 corresponds to the MFD. The error code indicates that the paper has jammed the motion of the one of the rollers in the MFD. The user of the mobile device 106 is assisted to navigate to the location of the roller. The roller may not as such be visible to the user by naked eye as the roller may be internal, within the casing of the MFD. Therefore, the first processor 202 may retrieve the image of the roller from the blueprint and accordingly display it to the user. The user, by looking at the image, may get know how the roller looks like. Thereafter, the first processor 202 may further display a video to the user, indicative of a possible procedure to resolve the error code, which in this case is to clear the paper path (e.g., by removing a particular tray of the MFD and pulling out sheet of trapped paper along the paper path).

In an alternate embodiment, a stream of images may be displayed to the user based on a real-time location of the mobile device 106. In an embodiment, the first processor 202 displays the stream of images to the user. In such a scenario, the first processor 202 tracks the first set of sensors 116 in real-time and accordingly determines the location of the mobile device 106. Based on the location of the mobile device 106, the first processor 202 displays the content indicative of the internal component of the electronic device 102. As soon as the location of the mobile device 106 changes, the image being displayed to the user also changes. The change in the image makes a perception of a video content being displayed to the user, where the video content displays the internal component to the user based on the location of the mobile device 106.

As step 1008, the user may resolve the error code based on the video to resolve the problem. In an embodiment, the user may perform a manual procedure (e.g., pulling out trapped path from paper path of the MFD) to resolve the particular error.

In an embodiment, the electronic device 102 may correspond to a multi-function device (MFD) that has the capability of at least printing, scanning, emailing, or faxing a document. For the purpose of ongoing description, the MFD has been considered to include a printer tray, a scanner tray, a document feeder tray, page path, etc. In an embodiment, the printer tray corresponds to tray where the printer paper are collected. Scanner tray corresponds to a tray from a document is scanned. Document feeder tray corresponds to a tray where blank papers are kept for printing. Page path corresponds to a series of rollers in the MFD that provide a path to the blank paper from the document feeder to the printing head and from the printing head to the printing tray. The controlling of the MFD using the mobile device 106 has been described in conjunction with FIG. 11.

Figure 11:
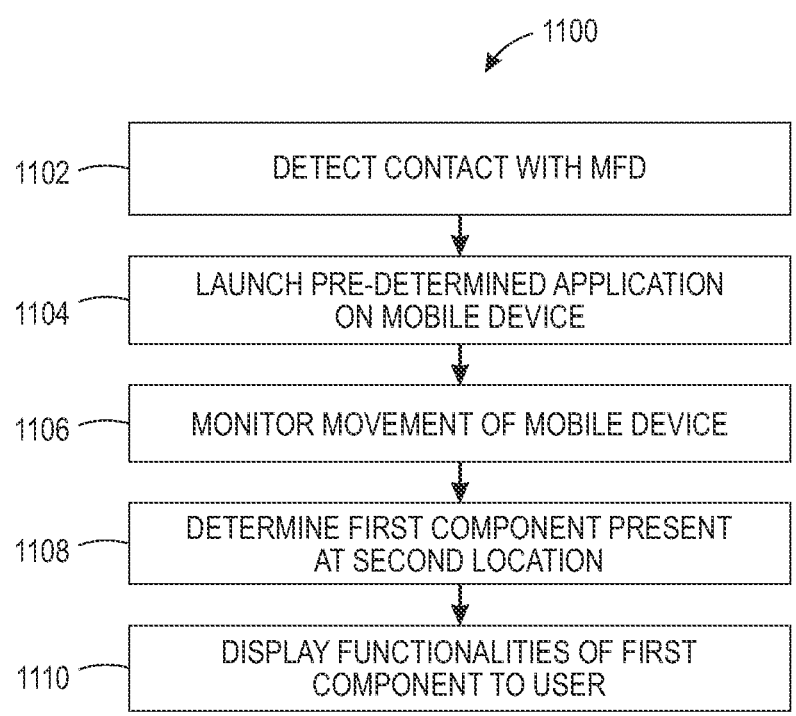
FIG. 11 is a flowchart illustrating a method to control a functionality of an MFD, in accordance with at least one embodiment.

FIG. 11 is a flowchart 1100 illustrating a method to control the functionality of an MFD, in accordance with at least one embodiment. The flowchart 1100 is described in conjunction with FIG. 3.

At step 1102, a contact with the MFD is detected. In an embodiment, the first processor 202 detects the contact. As discussed in step 302, the MFD may have the radio tag 110 attached on the outer body at a predetermined location. The mobile device 106 may tap onto the radio tag 110. On contact with the radio tag 110, the mobile device 106 may receive information pertaining to model number of the MFD, and the application metadata.

At step 1104, the application is launched on the mobile device 106. In an embodiment, the first processor 202 launches the application. The application utilizes the model number received from the radio tag 110 to query the database server 104. The first processor 202 receives the blueprint of the MFD from the database server 104 in response to the query. In an embodiment, the blueprint of the MFD includes the coordinates of the one or more components in the MFD. For example, the blueprint of the MFD includes the coordinates of the printer tray, the scanner tray, and the document feeder tray. Further, the blueprint of the MFD may include the functionality of each of the one or more components. Following table illustrates the functionalities of the one or more components in the MFD:

TABLE 3

One or more components in the MFD and corresponding functionalities.

| Components of the MFD | Functionalities |
|---|---|
| Document Feeder | Selection of Paper size<br>Selection document feeder tray to supply paper |

TABLE 3-continued

One or more components in the MFD and corresponding functionalities.

| Components of the MFD | Functionalities |
|---|---|
| Scanner Tray | Selection of scanner tray (Automatic document feeder or platen) Size of paper to be scanned |

At step 1106, the movement of the mobile device 106 is monitored. In an embodiment, the first processor 202 monitors the movement of the mobile device 106 from the predetermined reference location by monitoring the readings of the first set of sensors 116 in the mobile device 106. In an embodiment, the first processor 202 converts the readings of the mobile device 106 to the respective coordinates. In an embodiment, the determined coordinates may be indicative of the location of the mobile device 106 with respect to the MFD. The first processor 202 monitors the movement of the mobile device 106 until the mobile device 106 is at a second location. In an embodiment, the first processor 202 determines that the mobile device 106 is at the second location based on the readings of the first set of sensors 106. In an embodiment, the readings of the first set of sensors 116 may be constant, as the movement of the mobile device 106 may have stopped.

At step 1108, the first component present at the second location is determined. In an embodiment, the first processor 202 determines the identity of the first component, from the one or more components, by comparing the coordinates of the second location with the coordinates obtained from the blueprint of the MFD. For example, the first processor 202 may determine that the mobile device 106 is at the location of the document feeder.

At step 1110, the functionality of the first component is displayed to the user. In an embodiment, the first processor 202 displays the functionality of the first component to the user. In an embodiment, the first processor 202 may retrieve the functionality from the blueprint of the MFD. For example, the first processor 202 may display the functionality of the document feeder to the user (i.e., 1. Document feeder tray; 2. Paper size; etc.).

The user of the mobile device 106 may provide an input to select the document feeder. In an embodiment, the MFD may include more than one document feeder. For example, the mobile device 106 is at the location of the first document feeder, while the user selects the second document feeder. In such a scenario, the first processor 202 may determine that the mobile device 106 is at the location of the first document feeder based on the coordinates. The first processor 202 determines the coordinates of the second document feeder from the blueprint of the MFD. Thereafter, the first processor 202 may assist the user to move the mobile device 106 to the second document feeder. In an embodiment, the first processor 202 may follow the method as described in FIG. 6. After the mobile device 106 reaches the location of the second document feeder, the first processor 202 may display the functions of the second document feeder. Accordingly, the user of the mobile device 106 may provide inputs to control the functionality of the second document feeder.

A person having ordinary skill in the art would understand that the scope of the disclosure is not limited to moving the mobile device 106 to the location of the second document feeder. In an embodiment, the user of the mobile device 106 may directly provide inputs to control the functionality of the second document feeder. For example, after the user's selection of the second document feeder, the first processor 202 may display a set of functionalities associated with the second document feeder. For instance, the first processor 202 may display an option to the user to control the speed of the second document feeder.

The instructions to control the second component (e.g., a document feeder) are transmitted to the MFD over the network 114. Similarly, when the user of the mobile device 106 moves the mobile device 106 to the scanner tray, the first processor 202 displays an option to the user to select either the document feeder or the platen to scan the document.

Similarly, the first processor 202 may employ the method described in FIG. 10 to troubleshoot the MFD. A person having ordinary skill in the art would understand that scope of the disclosure is not limited to controlling the MFD using the mobile device 106. In an embodiment, any electronic device can be controlled using the embodiments illustrated above. For instance, a desktop computer includes many components which can be controlled using the mobile device 106. The desktop computer may have a radio tag 110, which can be tapped by the mobile device 106. Thereafter, the mobile device 106 can be moved around the desktop computer to control the one or more components.

Various embodiments of the disclosure lead to an increase in usability of complicated electronic devices such as, but not limited to, MFDs, printers, scanners, etc. As discussed in various embodiments, the disclosure provides for enhanced usability of the electronic device through a single communication tag (e.g., an NFC tag, a Bluetooth tag, an RFID tag, etc.) affixed at a first location on the electronic device. The first location may serve as a reference location through which a mobile device of a user may be contacted. A movement of the user's mobile device may be tracked by one or more sensors within the mobile device or one or more sensors attached to/within the electronic device. Thereafter, based on the tracked movement, the current location of the user's mobile device, i.e., a second location may be established based on a blueprint of the electronic device. Based on this location, the user may use/command a component of the electronic device, which is near the second location or otherwise associated with the second location. The user may also troubleshoot various components of the electronic device through the mobile device. Therefore, through the mobile device, the user may be displayed various options corresponding to appropriate components of the electronic device including options to control a component, check for errors, troubleshoot the component, navigate to a second component that is associated with the current component and may be causing a malfunction therein, and so on.

The disclosed methods and systems, as illustrated in the ongoing description or any of its components, may be embodied in the form of a computer system. Typical examples of a computer system include a general-purpose computer, a programmed microprocessor, a micro-controller, a peripheral integrated circuit element, and other devices, or arrangements of devices that are capable of implementing the steps that constitute the method of the disclosure.

The computer system comprises a computer, an input device, a display unit and the Internet. The computer further comprises a microprocessor. The microprocessor is connected to a communication bus. The computer also includes a memory. The memory may be Random Access Memory (RAM) or Read Only Memory (ROM). The computer system further comprises a storage device, which may be a hard-disk drive or a removable storage drive, such as, a floppy-disk drive, optical-disk drive, and the like. The storage device may also be a means for loading computer programs or other instructions into the computer system. The computer system also includes a communication unit. The communication unit allows the computer to connect to other databases and the Internet through an input/output (I/O) interface, allowing the transfer as well as reception of data from other sources. The communication unit may include a modem, an Ethernet card, or other similar devices, which enable the computer system to connect to databases and networks, such as, LAN, MAN, WAN, and the Internet. The computer system facilitates input from a user through input devices accessible to the system through an I/O interface.

In order to process input data, the computer system executes a set of instructions that are stored in one or more storage elements. The storage elements may also hold data or other information, as desired. The storage element may be in the form of an information source or a physical memory element present in the processing machine.

The programmable or computer-readable instructions may include various commands that instruct the processing machine to perform specific tasks, such as steps that constitute the method of the disclosure. The systems and methods described can also be implemented using only software programming or using only hardware or by a varying combination of the two techniques. The disclosure is independent of the programming language and the operating system used in the computers. The instructions for the disclosure can be written in all programming languages including, but not limited to, 'C', 'C++', 'Visual C++' and 'Visual Basic'. Further, the software may be in the form of a collection of separate programs, a program module containing a larger program or a portion of a program module, as discussed in the ongoing description. The software may also include modular programming in the form of object-oriented programming. The processing of input data by the processing machine may be in response to user commands, the results of previous processing, or from a request made by another processing machine. The disclosure can also be implemented in various operating systems and platforms including, but not limited to, 'Unix', 'DOS', 'Android', 'Symbian', and 'Linux'.

The programmable instructions can be stored and transmitted on a computer-readable medium. The disclosure can also be embodied in a computer program product comprising a computer-readable medium, or with any product capable of implementing the above methods and systems, or the numerous possible variations thereof.

Various embodiments of the methods and systems for controlling an electronic device have been disclosed. However, it should be apparent to those skilled in the art that modifications in addition to those described, are possible without departing from the inventive concepts herein. The embodiments, therefore, are not restrictive, except in the spirit of the disclosure. Moreover, in interpreting the disclosure, all terms should be understood in the broadest possible manner consistent with the context. In particular, the terms "comprises" and "comprising" should be interpreted as referring to elements, components, or steps, in a non-exclusive manner, indicating that the referenced elements, components, or steps may be present, or utilized, or combined with other elements, components, or steps that are not expressly referenced.

A person having ordinary skills in the art will appreciate that the system, modules, and sub-modules have been illustrated and explained to serve as examples and should not be considered limiting in any manner. It will be further appreciated that the variants of the above disclosed system elements, or modules and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules and is not limited to any particular computer hardware, software, middleware, firmware, microcode, or the like.

The claims can encompass embodiments for hardware, software, or a combination thereof.

It will be appreciated that variants of the above disclosed, and other features and functions or alternatives thereof, may be combined into many other different systems or applications. Presently unforeseen or unanticipated alternatives, modifications, variations, or improvements therein may be subsequently made by those skilled in the art, which are also intended to be encompassed by the following claims.

What is claimed is:

1. A method for controlling an electronic device, the method comprising:
   in a mobile device:
   detecting a contact with the electronic device at a predetermined reference location on the electronic device;
   tracking a movement of the mobile device from the predetermined reference location to a second location on the electronic device, wherein the movement of the mobile device is tracked based on a reading of one or more sensors associated with the mobile device, and wherein the reading is transmitted from the mobile device periodically to the electronic device, and wherein the second location corresponds to a first component of the electronic device;
   receiving an input from a user to control one or more functionalities of the first component; and
   transmitting at least a command from the mobile device to control the first component.

2. The method of claim 1, wherein the predetermined reference location comprises a near field communication (NFC) tag, wherein the mobile device detects the contact with the NFC tag.

3. The method of claim 2 further comprising automatically launching an application, preinstalled on the mobile device, based on the detection of the contact with the NFC tag.

4. The method of claim 3 further comprising receiving at least an identification number of the electronic device from the NFC tag based on the contact.

5. The method of claim 4 further comprising querying a database for a blueprint associated with the electronic device based on the identification number, wherein the blueprint includes at least an index of one or more components in the electronic device and a corresponding location of the one or more components from the predetermined reference location.

6. The method of claim 5 further comprising identifying the first component based on the second location and the blueprint.

7. The method of claim 1 further comprising receiving an input from the user to launch an application.

8. The method of claim 7 further comprising receiving a user-input indicative of an identification number of the electronic device, wherein the application queries the database to extract a blueprint of the electronic device.

9. The method of claim 1, wherein the tracking is performed by the one or more sensors associated with the mobile device, wherein the one or more sensors comprise at least one of an accelerometer, a gyroscope, or an image-capturing device.

10. The method of claim 1 further comprising capturing an image of the second location.

11. The method of claim 10 further comprising identifying the first component by utilizing one or more image processing techniques on the captured image.

12. The method of claim 1 further comprising transmitting instructions to the electronic device over a network to control the one or more functionalities of the first component based on the input received from the user.

13. The method of claim 1 further comprising receiving at least an error code from the electronic device.

14. The method of claim 13 further comprising instructing the user to navigate to a third location, wherein the third location corresponds to a second component that has caused generation of the error code.

15. The method of claim 14 further comprising displaying a content indicative of at least a method to resolve the error code.

16. A method for controlling a multi-function device (MFD), the method comprising:
in a mobile device:
detecting a contact with the MFD at a predetermined reference location on the MFD, wherein the MFD is capable of processing at least a print job, a scan job, a copy job, a fax job, and an email job;
tracking a movement of the mobile device from the predetermined reference location to a second location on the MFD, wherein the movement of the mobile device is tracked based on a reading of one or more sensors associated with the mobile device, and wherein the reading is transmitted from the mobile device periodically to the MFD, and wherein the second location corresponds to a first component of the MFD;
receiving an input from a user to control one or more functionalities of the first component; and
transmitting at least a command from the mobile device to control the first component.

17. The method of claim 16 further comprising receiving at least an identification number of the MFD based on the contact, wherein the identification number is indicative of the model/make of the MFD.

18. The method of claim 17 further comprising querying a database for a blueprint associated with the MFD based on the identification number, wherein the blueprint includes at least an index of one or more components in the MFD and a corresponding location of the one or more components from the predetermined reference location.

19. The method of claim 16 further comprising capturing an image of the second location.

20. The method of claim 19 further comprising identifying the first component by utilizing one or more image processing techniques on the captured image.

21. The method of claim 16 further comprising transmitting instructions to the MFD over a network to control the one or more functionalities of the first component based on the input received from the user.

22. The method of claim 18, wherein the one or more components comprise at least one of document feeder module, scanning module, printer module, communication module, or display module.

23. A method for troubleshooting an electronic device, the method comprising:
in a mobile device:
detecting a contact with the electronic device at a predetermined reference location on the electronic device;
receiving readings of one or more sensors from the electronic device, wherein the readings of the one or more sensors are indicative of an error in at least one component of the electronic device;
receiving an instruction from the electronic device to navigate from the predetermined reference location to a second location, wherein the second location corresponds to a location of a second component on the electronic device; and
displaying a content, wherein the content corresponds to at least a method to resolve the error, wherein the error is resolvable manually by a user.

24. A mobile device for controlling an electronic device, the mobile device comprising:
one or more processors configured to:
detect a contact with the electronic device at a predetermined reference location on the electronic device;
tracking a movement of the mobile device from the predetermined reference location to a second location on the electronic device, wherein the movement of the mobile device is tracked based on a reading of one or more sensors associated with the mobile device, and wherein the reading is transmitted from the mobile device periodically to the electronic device, and wherein the second location corresponds to a first component of the electronic device;
receive an input from a user to control one or more functionalities of the first component; and
transmitting at least a command from the mobile device to control the first component.

25. The mobile device of claim 24, wherein the predetermined reference location comprises a near field communication (NFC) tag, wherein the one or more processors are further configured to automatically launch a pre-installed application on the mobile device based on the detection of the NFC tag.

26. The mobile device of claim 25, wherein the one or more processors are further configured to query a database for a blueprint associated with the electronic device based on an identification number of the electronic device received from the NFC tag, wherein the blueprint includes at least an index of one or more components in the electronic device and a corresponding location of the one or more components from the predetermined reference location.

27. The mobile device of claim 24, wherein the one or more processors are further configured to transmit instructions to the electronic device over a network to control the one or more functionalities of the first component based on the input received from the user.

28. The mobile device of claim 24, wherein the one or more processors are further configured to:
receive an error code from the electronic device, wherein the error code is indicative of a malfunctioning component in the electronic device; and
instruct the user to navigate to a third location, wherein the third location corresponds to the malfunctioning component that has caused generation of the error code.

29. A computer program product for use with a mobile device, the computer program product comprising a non-transitory computer readable medium, the non-transitory computer readable medium stores a computer program code for controlling an electronic device, the computer program code is executable by one or more processors in the mobile device to:
detect a contact with the electronic device at a predetermined reference location on the electronic device;
track a movement of the mobile device from the predetermined reference location to a second location on the electronic device, wherein the movement of the mobile device is tracked based on a reading of one or more sensors associated with the mobile device, and wherein the reading is transmitted from the mobile device periodically to the electronic device, and wherein the second location corresponds to a first component of the electronic device;

receive an input from a user to control one or more functionalities of the first component; and transmitting at least a command from the mobile device to control the first component.

30. A method for controlling an electronic device, the method comprising:

in the electronic device:

tracking a movement of a mobile device from a predetermined reference location on the electronic device to a second location on the electronic device, wherein the movement of the mobile device is tracked based on a reading of one or more sensors associated with the mobile device, and wherein the reading is received from the mobile device periodically; and determining a first component of the electronic device at the second location;

transmitting one or more functionalities associated with the first component to the mobile device;

receiving at least a command from the mobile device to control the first component.

* * * * *